US012709465B2

(12) United States Patent
Lentz et al.

(10) Patent No.: US 12,709,465 B2
(45) Date of Patent: Aug. 18, 2026

(54) SYSTEM, APPARATUS, AND METHOD FOR SORTABLE WASTE COLLECTION STATION

(71) Applicant: WasteXperts, Inc., Reno, NV (US)

(72) Inventors: David Lentz, Reno, NV (US); Derek Ruckman, Reno, NV (US)

(73) Assignee: L&R, LLC, Reno, NV (US)

( * ) Notice: Subject to any disclaimer, the term of this patent is extended or adjusted under 35 U.S.C. 154(b) by 0 days.

(21) Appl. No.: 18/496,453

(22) Filed: Oct. 27, 2023

(65) Prior Publication Data

US 2024/0140700 A1 May 2, 2024

Related U.S. Application Data

(60) Provisional application No. 63/419,765, filed on Oct. 27, 2022.

(51) Int. Cl.
*B65F 1/12* (2006.01)
*B65F 1/14* (2006.01)

(52) U.S. Cl.
CPC .............. *B65F 1/12* (2013.01); *B65F 1/1473* (2013.01); *B65F 2210/132* (2013.01); *B65F 2210/178* (2013.01); *B65F 2220/101* (2013.01)

(58) Field of Classification Search
CPC .... B65F 1/12; B65F 1/1473; B65F 2210/132; B65F 2210/178; B65F 2220/101
USPC .......................................................... 220/600
See application file for complete search history.

(56) References Cited

U.S. PATENT DOCUMENTS 1,740,000 A * 12/1929 Andrews ............ B65D 90/0086 105/377.05
4,103,608 A * 8/1978 Chenot ................. B30B 9/3046 49/386
5,174,468 A * 12/1992 Holderman ........... B65F 1/0066 220/571
5,408,790 A * 4/1995 Hoesten ................. B65D 90/24 52/169.9
5,901,874 A * 5/1999 Deters ........................ B65F 1/16 220/908
6,299,008 B1 * 10/2001 Payne ................ B65D 90/0013 220/1.5
6,702,135 B2 * 3/2004 Pickler ...................... B60P 1/50 220/601

(Continued)

FOREIGN PATENT DOCUMENTS

CN 205652016 U * 10/2016

*Primary Examiner* — Orlando E Aviles
*Assistant Examiner* — Niki M Eloshway
(74) *Attorney, Agent, or Firm* — Nixon Peabody LLP

(57) ABSTRACT

A waste container includes a floor, a first side wall, a second side wall, a back wall, a front wall, a first door, and a second door. The first and second side walls are spaced apart from each other. The back wall extends between the first side wall and the second side wall. The front wall extends from the first side wall toward the second side wall such that a gap is defined between the front wall and the second side wall. The first door and the second door are each movable between an open position and a closed position. The first door in the closed position extends between the front wall and the second side wall so all the gap is blocked. The second door in the closed position extends between the front wall and the second side wall so only a portion of the gap is blocked.

15 Claims, 9 Drawing Sheets

(56) References Cited

U.S. PATENT DOCUMENTS

| | | | | |
|---|---|---|---|---|
| 7,083,060 | B2 * | 8/2006 | Pickler | B65F 1/1607 220/601 |
| 8,820,558 | B2 * | 9/2014 | Van der Korput | B65D 19/08 220/660 |
| 12,049,354 | B2 * | 7/2024 | Fletcher | B65D 88/12 |
| 2006/0201939 | A1 * | 9/2006 | McPhee | B65D 88/121 220/1.5 |
| 2019/0152691 | A1 * | 5/2019 | Wegener | B65D 88/127 |
| 2023/0219747 | A1 * | 7/2023 | Nelson | B65F 1/006 232/1 R |

* cited by examiner

SYSTEM, APPARATUS, AND METHOD FOR SORTABLE WASTE COLLECTION STATION

CROSS-REFERENCE TO RELATED APPLICATIONS

This application claims priority to and the benefit of U.S. Provisional Application No. 63/419,765, filed on Oct. 27, 2022, which is hereby incorporated by reference herein in its entirety.

FIELD OF THE INVENTION

The present disclosure relates generally to on-site solid waste and recyclable materials management. More particularly, the present disclosure related to an adjustable waste collection corral.

BACKGROUND OF THE INVENTION

The cost of processing, sorting, and transporting waste materials is a substantial and growing cost to society. The amount of organic food waste alone generated in the United States is in the millions of tons per year. When such organic waste is disposed in landfills, its anaerobic breakdown results in methane production, which is a more potent greenhouse gas that carbon dioxide.

With many cities, counties, states, and the federal government mandating, or being expected to soon mandate, carbon reduction strategies in the efforts to tackle climate change, minimizing the impacts of organic waste management and increasing recycling compliance and efficiencies may play key roles in such efforts.

In connection with efforts to manage waste and recycling efforts, cities, counties, states, and the federal government in some instances have implemented systems for handling waste that include multiple receptacles for traditional food waste, recyclable materials, and perhaps other categories. In some instances, there are multiple distinct receptacles for different recyclable materials. The problem is that people often do not self-sort their waste. Thus, a great amount of inefficiency in the system persists.

In other instances, there are ostensible requirements to place certain types of waste in color-coded bags. Again, compliance with such requirements is spotty, which minimizes its efficacy in addressing issues with waste collection and storage and its impacts.

And, when traditional commercial waste collection entities collect waste and recyclable materials, they often compact it, then take it to a large facility for some sorting, and then the materials are baled and sent to market for sale. The problems are that such practices are very expensive, compacting the materials can damage them, and commingled, compacted waste and recyclable material can result in contamination of the different types of potential waste or recyclable material.

Current solid was containers used for on-site sorting/processing (e.g., in office buildings, manufacturing plants, multi-family residences, sports arenas, and the like) prior to waste material being hauled off to landfills suffer from multiple problems. The collected waste material is often not properly sorted by those generating the waste, and the current containers designed for hauling automation and efficiency, not onsite processing. As a result, they have confined space barriers to effective and safe sorting on-site. Moreover, current solid waste containers are not customized for the space of the trash collection room, enclosures, loading docks, etc. This leads to inefficient use of space and additional containers needed to handle the material. The present disclosure is directed to solving these and other problems.

SUMMARY OF THE INVENTION

The present invention is directed to a waste container that includes a floor, a first side wall, a second side wall, a back wall, a front wall, a first door, and a second door. The first side wall coupled to the floor. The second side wall is coupled to the floor and is spaced apart from the first side wall. The back wall is coupled to the floor and extends between a back edge of the first side wall and a back edge of the second side wall. The front wall is coupled to the floor and extends from a front edge of the first side wall toward the second side wall such that a gap is defined between the front wall and the second side wall. The first door is movably coupled to the front wall and is movable between an open position and a closed position. The first door in the closed position extends between the front wall and a front edge of the second side wall such that all the gap is blocked by the first door. The second door is movably coupled to the floor, the second side wall, or both, and is movable between an open position and a closed position. The second door in the closed position extends between the front wall and the front edge of the second side wall such that only a portion of the gap is blocked by the second door.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The present invention will be described with greater specificity and clarity with reference to the following drawings, in which.

Figure 1:
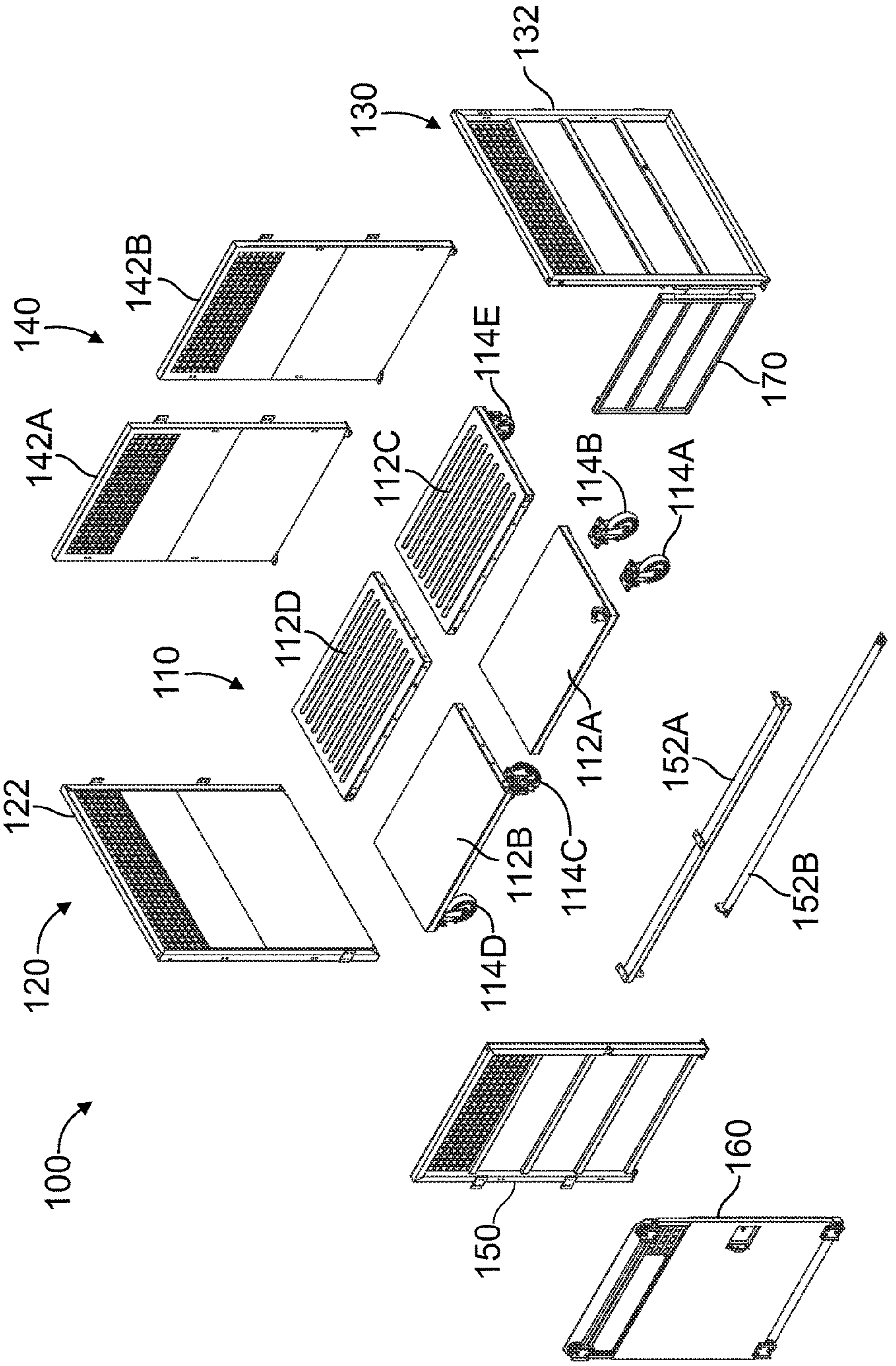
FIG. 1 is an exploded view of a waste container, according to aspects of the present disclosure.

While the invention is susceptible to various modifications and alternative forms, specific embodiments will be shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

The drawings will herein be described in detail with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

FIG. 1 is an exploded view of a modular waste container 100. The waste container 100 can be located on-site at any location where large amounts of waste are collected. For example, the waste container 100 can be located in a trash collection room of a multi-story building, such as an office building or an apartment building. The waste container 100 can be placed underneath a trash chute that empties into the trash collection room from each of the floors of the building, such that any waste material (e.g., garage bags filled with trash) deposited into the trash chute from any of the floors will fall out of the trash chute and be received in the waste container 100. The large area of the waste container 100 allows for workers to easily walk into the waste container 100 to be able sort through the waste material or perform any other desired functions.

The waste container 100 includes a floor, a first side wall 120 coupled to the floor, a second side wall 130, a back wall 140, a front wall 150, a first door 160, and a second door 170. The first side wall 120 and the second side wall 130 are spaced apart from each other are coupled to opposing side edges of the floor. The back wall 140 is coupled to the back edge of the floor, and extends between a back edge of the first side wall 120 and a back edge of the second side wall 130. The front wall 150 is coupled to a portion of a front edge of the floor, and extends from a front edge of the first side wall 120 toward the second side wall 130. The first door 160 is movably coupled to the front wall 150, and the second door 170 is movably coupled to the floor, the second side wall 130, or both. The walls of the waste container 100 will generally also be coupled together at the corners thereof in some fashion. For example, the first side wall 120 is coupled to the back wall 140 and the front wall 150, and the second side wall 130 is coupled to the back wall 140 and the second door 170. The first door 150 is coupled to the front wall 150, and in some cases can be coupled to the second side wall 130 and/or the second door 170.

In the implementation illustrated in FIG. 1, the floor is formed from four equally-sized floor units 112A, 112B, 112C, and 112D that are coupled together to form the floor. In other implementations however, the floor could be formed by any number of floor units having any size. For example, in some implementations the floor is a single piece (e.g., a single floor unit). In other implementations, the floor can be formed from a plurality of floor units. In some of these implementations, each of the floor units has the same size and/or shape, while in others of these implementations, at least one of the floor units has a size and/or shape that is different from at least one other floor unit. Thus, while the illustrated implementation shows four floor units 112A-112D that each have the same size and shape, some implementations may include floor units of different sizes and/or floor units of different shapes.

The modularity of the floor allows the waste container 100 to have different sizes/configurations for different uses. In one example, the floor can be adjusted for larger and smaller rooms. The floor can be formed from more floor units when the waste container 100 is in a larger room, and from fewer floor units when the waste container 100 is in a smaller room. In another example, the floor can be adjusted based on the shape of the room. If the room is generally symmetrical, the floor can be formed from floor units forming square, where both dimensions of the floor (e.g., the width and length along the floor) are equal. If the room is rectangular, the floor can be formed from more floor units along one dimension than the other.

In general, the floor will have a generally planar cross-section that extends in two dimensions along the floor of the room in which the waste container 100 is located, which thus define the length and width of the floor. In some implementations, the floor includes an equal number of floor units extending along both dimensions (e.g., a 4×4 grid of floor units, a 6×6 grid of floor units), such that the floor will have a square cross-section with both sides equal. In other implementations, the floor will have more floor units extending along one dimension than the other (e.g., a 4×6 grid of floor units), such that the floor will have a rectangular cross-section. However, the floor could have cross-sections of irregular shapes as well. For example, a plurality of floor units can be arranged in an "L" shape to form a floor with an L-shaped cross-section.

The floor may also include a number of wheels on which it is mounted, which allows the waste container 100 to easily be moved around. In FIG. 1, floor unit 112A is mounted on wheels 114A and 114B, floor unit 112B is mounted on wheels 114C and 114D, floor unit 112C is mounted on wheel 114E, and floor unit 112D is not mounted on any wheels. Thus, any of the floor units forming the floor can be mounted on wheels to allow the waste container 100 to be moved. If the floor is a single piece, the floor can be mounted on a plurality of wheels. If the floor is formed from a plurality of floor units, then generally at least two of the floor units will each be mounted one at least one wheel.

In the illustrated implementation, the first side wall 120 is formed from a single side wall unit 122, the second side wall 130 is formed from a single side wall unit 132, and the back wall 140 is formed from two back wall units 142A and 142B. However, each of these walls can generally be formed any number of wall units depending on the shape and/or size of waste container 100 and the floor. Moreover, these wall units can generally have any size. Thus, while the combined width of the two back wall units 142A and 142B is larger than the width of the single side wall units 122 and 132, the back wall 140 could instead be formed from a single back wall unit that is wider than the side wall units 122 and 132. In general, the first side wall 120, the second side wall 130, and the back wall 140 can have any desired size and/or shape, and may be formed form any number of individual wall units.

While the back wall 140 extends all the way between the first side wall 120 and the second side wall 130, the front wall 150 will extend from the first side wall 120 but stops short of the second side wall 130. The first door 160 can then be movably coupled to the front wall 150 so that the first door 160 can move between an open position and a closed position. When the first door 160 is in the open position, there will be a gap between the front wall 150/first door 160 and the second side wall 130. When the first door 160 is in the closed position, this gap will be eliminated, and the front wall 150 and the first door 160 together will extend the full distance between the first side wall 120 and the second side wall 130. In the illustrated implementation, the waste container 100 includes a top rail 152A and a bottom rail 152B extending between the front wall 150 and the second side wall 130. The first door 160 is mounted on the rails 152A and 152B so that the first door 160 can slide between its open and closed positions. However, the first door 160 can be coupled to the front wall 150 (and/or to any other components of the waste container 100) in other manners, as long as the first door 160 can move between an open position and closed position.

The second door 170 can be movably coupled the floor and/or the second side wall 130 and can move between an open position and a closed position. In the illustrated implementation, the second door 170 is movably coupled to only the second side wall 130 and pivots between the open position and the closed position about a generally vertical axis that is coplanar with the first side wall 120, the second side wall 130, the back wall 140, the front wall 150, and the first door 160, and is normal to the floor. In other implementations, the second door 170 is movably coupled to only the floor and pivots between the open position and the closed position about a generally horizontal axis that is coplanar with the floor and is normal to the first side wall 120, the second side wall 130, the back wall 140, the front wall 150, and the first door 160. In further implementations, the second door 170 is releasably coupled to both the floor and the second side wall 130. The second door 170 can be released from the floor so that it can pivot between the open position and the closed position about the vertical axis, and can be released from the second side wall 130 so that it can pivot between the open position and the closed position about the horizontal axis. When the second door 170 is movably coupled to the floor and is in the open position, the second door 170 forms a ramp into the interior of the waste container 100.

In some implementations, the floor is solid (e.g., each of the floor units forming the floor are solid), such that all waste rests on the surface of the floor. In other implementations, some or all of the floor may be formed as a drain pan with an overlying grate, which allows liquid waste to be collected in the drain pan and for solid and semi-solid waste to collect on the surface of the grate. In FIG. 1, the floor units 112C and 112D are illustrated as being formed from a grate disposed on top of a drain pan, so that liquid waste can pass through the grate and collection in the drain pan. In general, any portion of the floor may be formed as a grate disposed on top of a drain pan. In some implementations, each individual floor unit is formed from a grate disposed on top of a drain pan. In some of these implementations, the drain pan of each floor unit is separate from the drain pan of the other floor units. In others of these implementations, the drain pans of the floor units form a single large drain pan. In these implementations, the drain pans of any interior floor units will not have side edges, so that that the grates of those drain pans are disposed above what is essentially a flat surface. The drain pans of the perimeter floor units can have raised edges on the sides that form the perimeter of the floor as a whole.

Figure 2A:
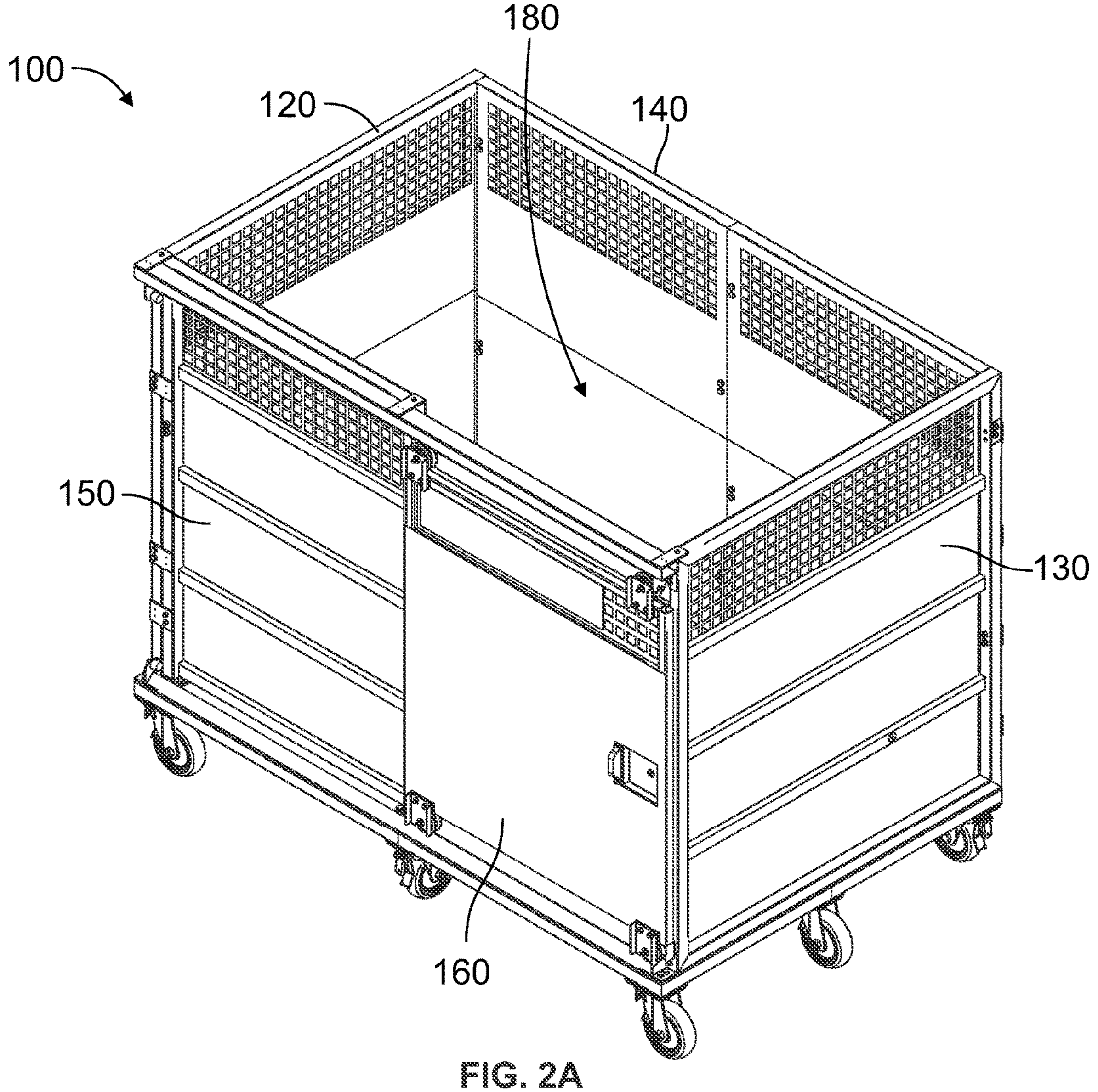
FIG. 2A is a perspective view of the waste container with a first door in a closed position, according to aspects of the present disclosure.

FIG. 2A shows the waste container 100 when the first door 160 is in the closed position. As shown, the first side wall 120, the second side wall 130, the back wall 140, the front wall 150, and the first door 160 form a closed perimeter that defines the interior space 180 of the waste container 100. This configuration of the waste container 100 is the standard configuration when the waste container 100 is in use. The waste container 100 can be placed in a trash collection room underneath the trash chute, so that any garbage bags or other waste that is deposited into the trash chute will fall into the interior space 180 of the waste container 100. Because of the perimeter formed by the waste container 100 around the interior space 180, garbage bags and other waste will remain inside the waste container 100. The walls and the first door are of sufficient height (e.g., 5 feet, 10 feet, 15 feet, etc.) so that a large amount of garage bags and other waste can be collected in the waste container 100 without overflowing, and without having to empty the waste container 100 too frequently (e.g., every day, multiple times per day, etc.).

Figure 2B:
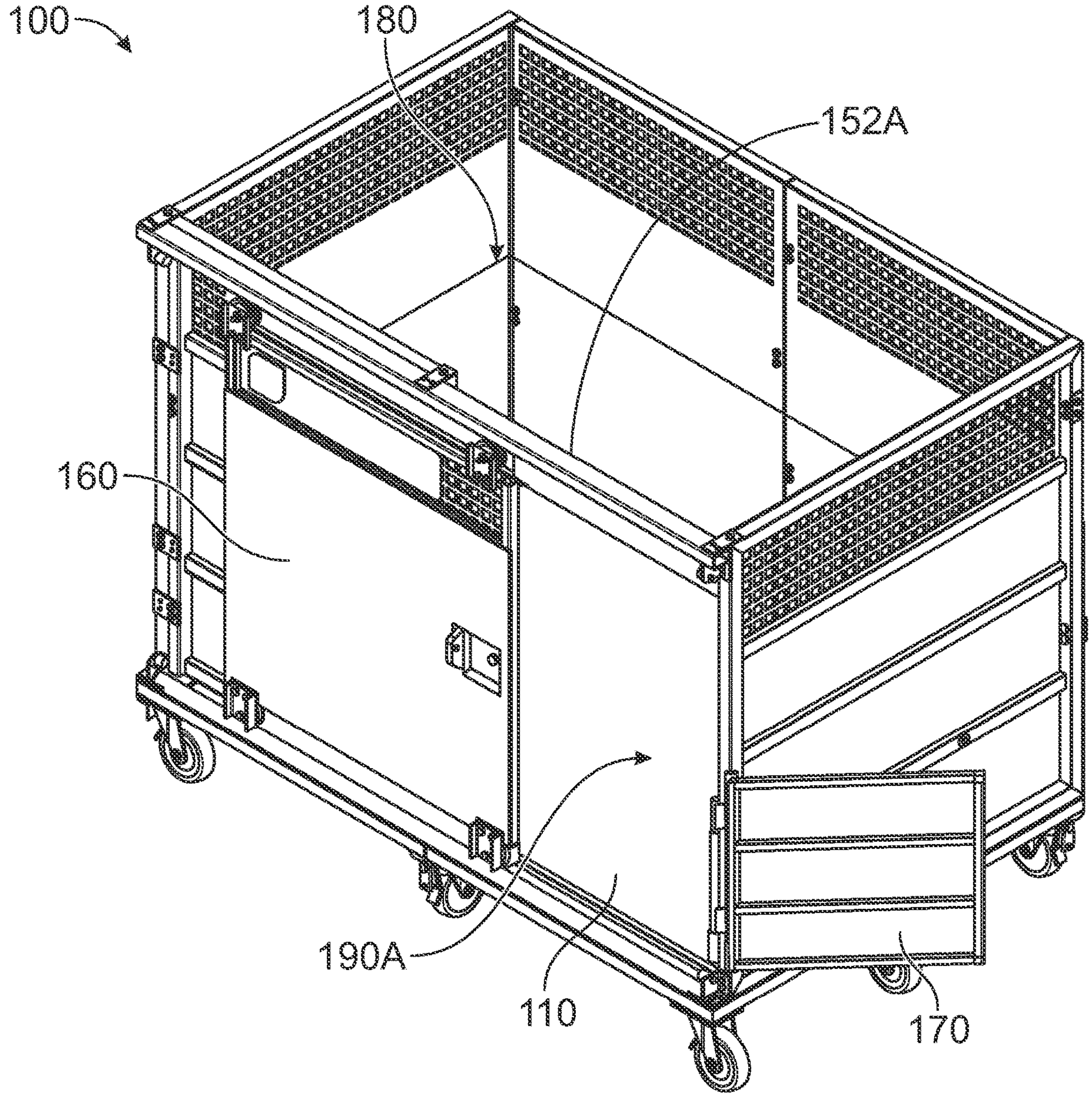
FIG. 2B is a perspective view of the waste container with the first door and a second door each in an open position, according to aspects of the present disclosure.

FIG. 2B shows the waste container 100 when both the first door 160 and the second door 170 are in their open positions. As shown, a gap 190A is defined between the front wall 150 and the second side wall 130. This gap 190A has a height that generally spans the full height of the waste container 100 from the floor to the top rail 152A. The gap 190A allows for workers to access garbage bags and other waste that have been collected within the interior space 180 of the waste container 100. When the first door 160 is in its closed position (FIG. 2A), the entirety of the gap 190A is blocked or eliminated. When the first door 160 and the second door are each in their open positions, the gap 190A is not blocked at all. If the waste in the waste container 100 is piled sufficiently high, the waste could fall out of the interior space 180 through the gap 190A if the first door 160 and the second door 170 were to be simultaneously moved to their open positions (or if the second door 170 did not exist), which could potentially harm any workers in the vicinity and cause waste to spill onto the floor.

Figure 2C:
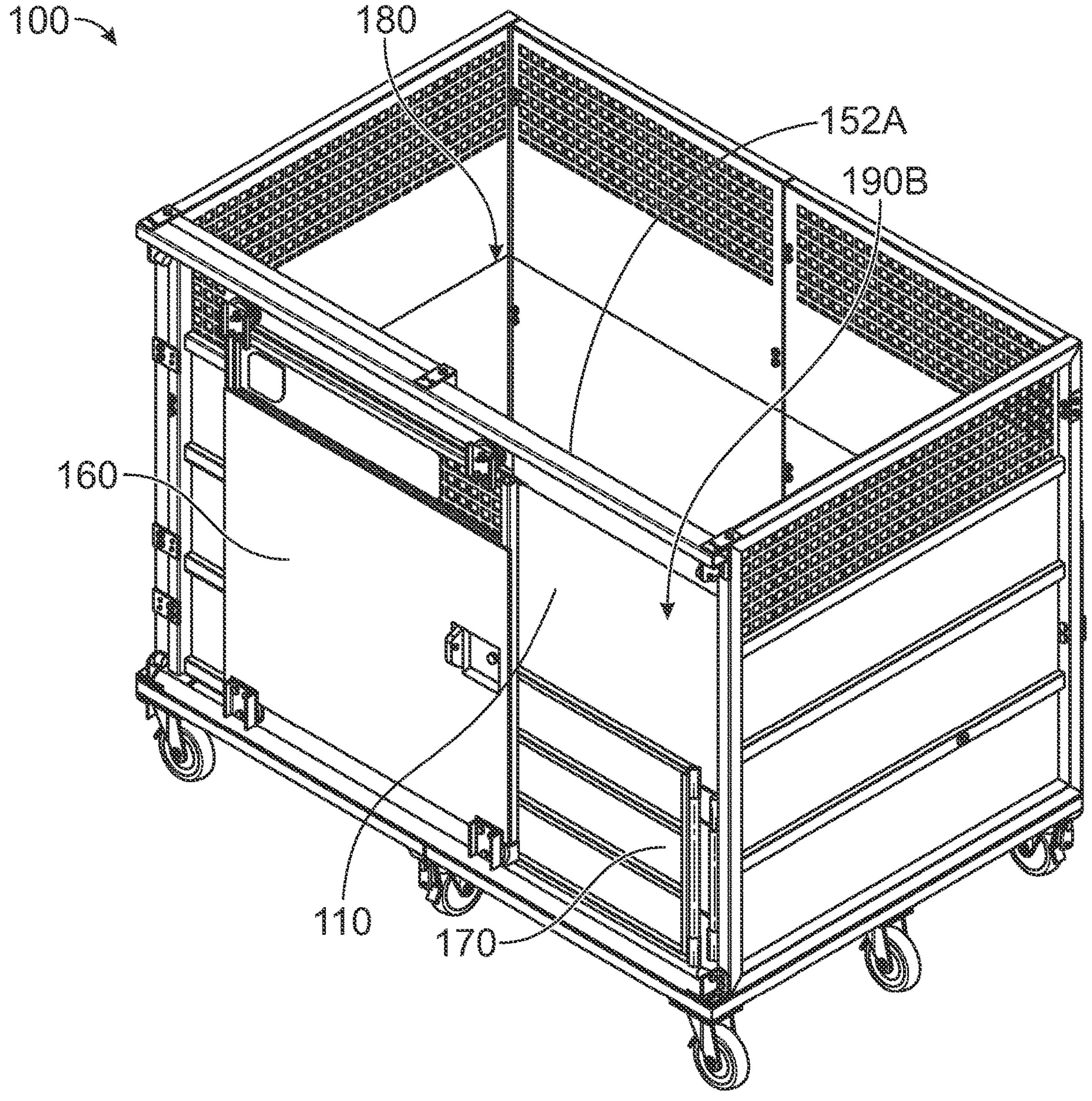
FIG. 2C is a perspective view of the waste container with the first door in the open position and the second door in a closed position, according to aspects of the present disclosure.

FIG. 2C shows the waste container 100 when the first door 160 is in the open position and the second door 170 is in the closed position. As shown, the second door 170 in the closed position blocks only a portion of the gap 190A to form a smaller gap 190B. Workers can access the interior space 180 through the gap 190B and move waste out of the way of the second door 170, which can then allow the second door 170 to be moved to the open position without any waste spilling out of the waste container 100. Workers can also begin performing an initial sort of the waste within the interior space 180, for example by removing garbage bags through the gap 190A for sorting until the second door 170 can be opened.

The portion of the gap 190A that is blocked by the second door 170 in its closed position can generally be any amount needed to ensure that waste does not inadvertently fall out of the waste container 100 through gap 190B when the first door 160 is opened. In some implementations, the portion of the gap 190A blocked by the second door 170 is between about 33% and about 66%, or about 50%. Correspondingly, the first door 160 will have a first height relative to the floor (e.g., the distance between the floor and the top rail 152A), and the second door 170 will have a second height relative to the floor (e.g., the distance between the floor and the opposing edge of the second door 170) that is between about 33% and about 66% of the first height, or about 50% of the first height. In general, the second door 170 can have any height that is needed (and correspondingly can block any amount of the larger gap 190A that is needed) to prevent garbage bags and other waste from spilling out of the waste container 100 through the smaller gap 190B during typical use of the waste container 100.

The heights of the first door 160 and the second door 170 can also be defined in raw measurements. For example, the first door 160 can have a height of about 5 feet, about 10 feet, about 15 feet, between about 5 feet and about 10 feet, between about 10 feet and about 15 feet, between about 5 feet and about 15 feet, and other heights. The second door 170 can have a height of about 2 feet, about 3 feet, about 4 feet, about 5 feet, between about 2 feet and about 3 feet, between about 2 feet and about 4 feet, between about 2 feet and about 5 feet, between about 3 feet and about 4 feet, between about 3 feet and about 5 feet, between about 4 feet and about 5 feet, and other heights.

Figure 3A:
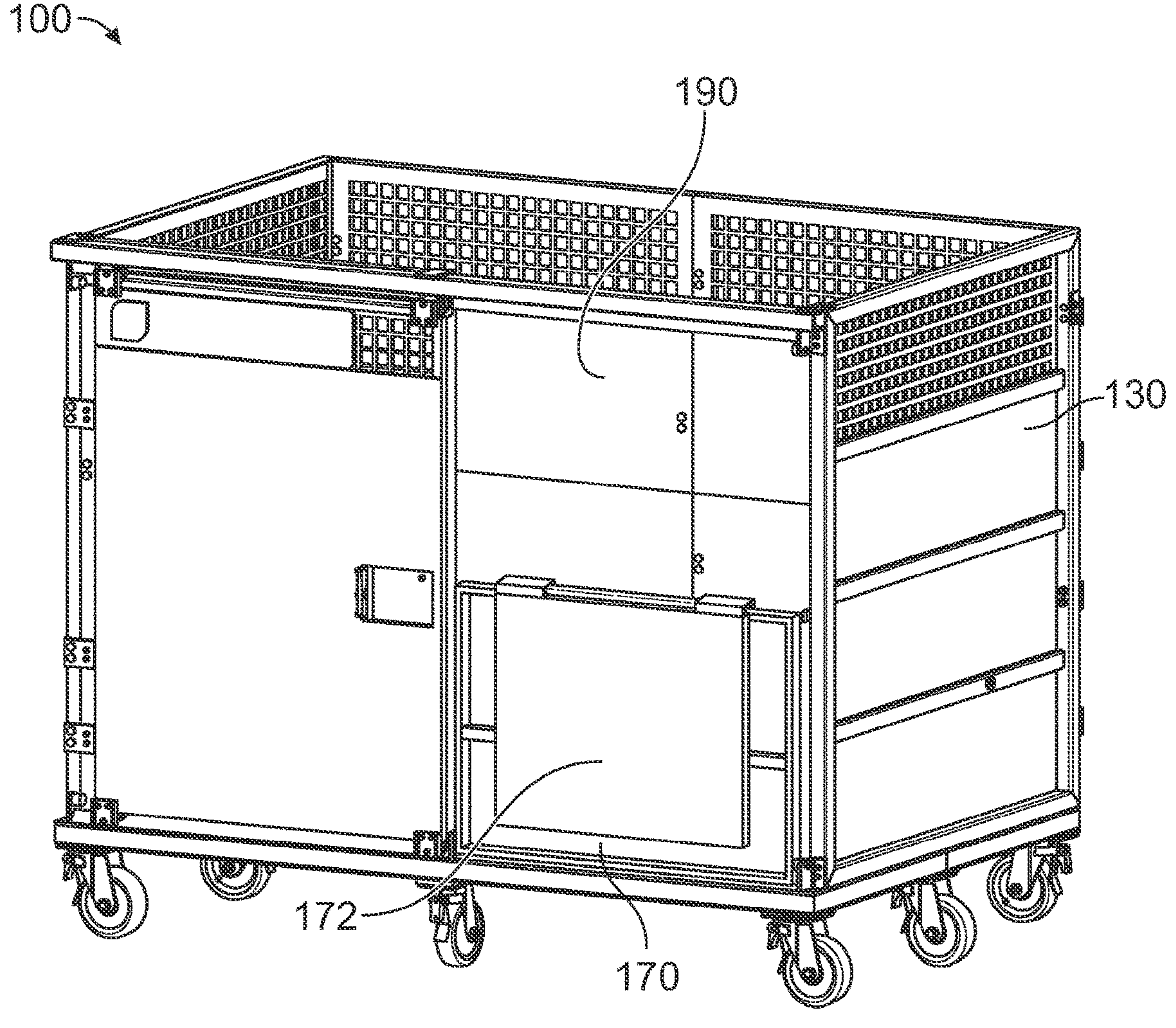
FIG. 3A is a perspective view of an alternative implementation of waste container with the second door coupled to a floor and in the closed position, according to aspects of the present disclosure.
Figure 3B:
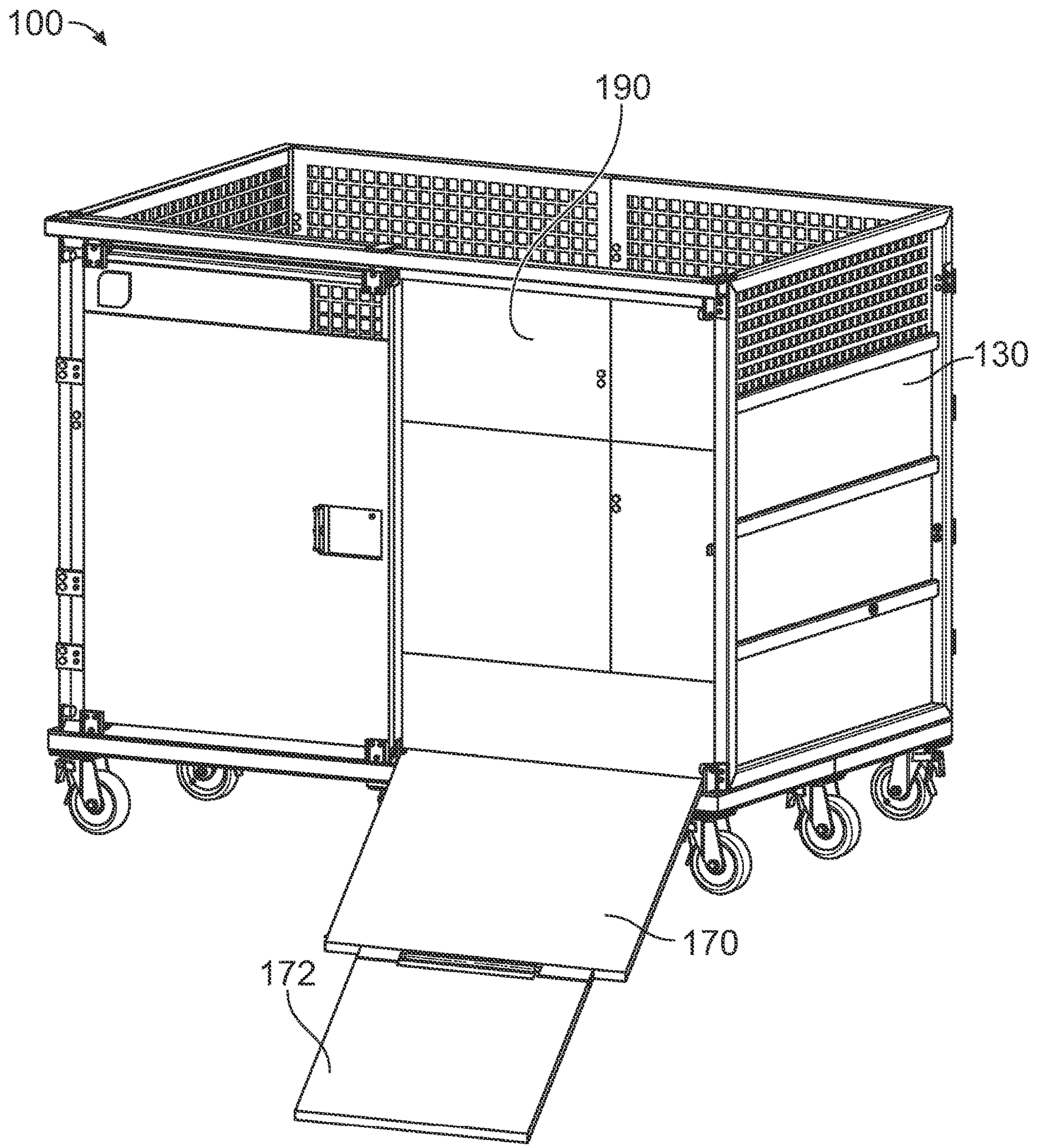
FIG. 3B is a perspective view of the waste container of FIG. 3A with the second door in the open position, according to aspects of the present disclosure.

FIGS. 3A and 3B show the implementation of the waste container 100 when the second door 170 is coupled to the floor instead of the second side wall 130. As shown, the waste container 100 in this implementation is generally identical to the implementation in FIGS. 2A-2C, except that the second door 170 is coupled to the floor, and thus rotates about a generally horizontal axis instead of a generally vertical axis. In FIG. 3A, the second door 170 is in the closed position and blocks a portion of the larger gap 190A to form the smaller gap 190B. The height of the second door 170 in this implementation can be same as the height of the second door 170 in the implementation of FIGS. 2A-2C where the second door 170 is coupled to the second side wall 130. Additionally, the second door 170 can have an additional ramp portion 172 that is hingedly coupled to the second door 170.

In FIG. 3B, the second door 170 has rotated downward to the open position, such that no portion of the larger gap 190A is blocked, allowing full access into the interior space 180 of the waste container 100. The ramp portion 172 has also been unfolded such that the second door 170 and the ramp portion 172 form a ramp from the ground leading into the interior space 180 of the waste container 100. The ramp can be used to wheel certain items or devices up to and/or into the waste container 100. For example, smaller wheeled waste carts can be wheeled up the ramp and in some cases into the interior space 180, so that workers in the interior space 180 can easily transfer garbage bags and other waste into the wheeled waste carts.

Figure 4:
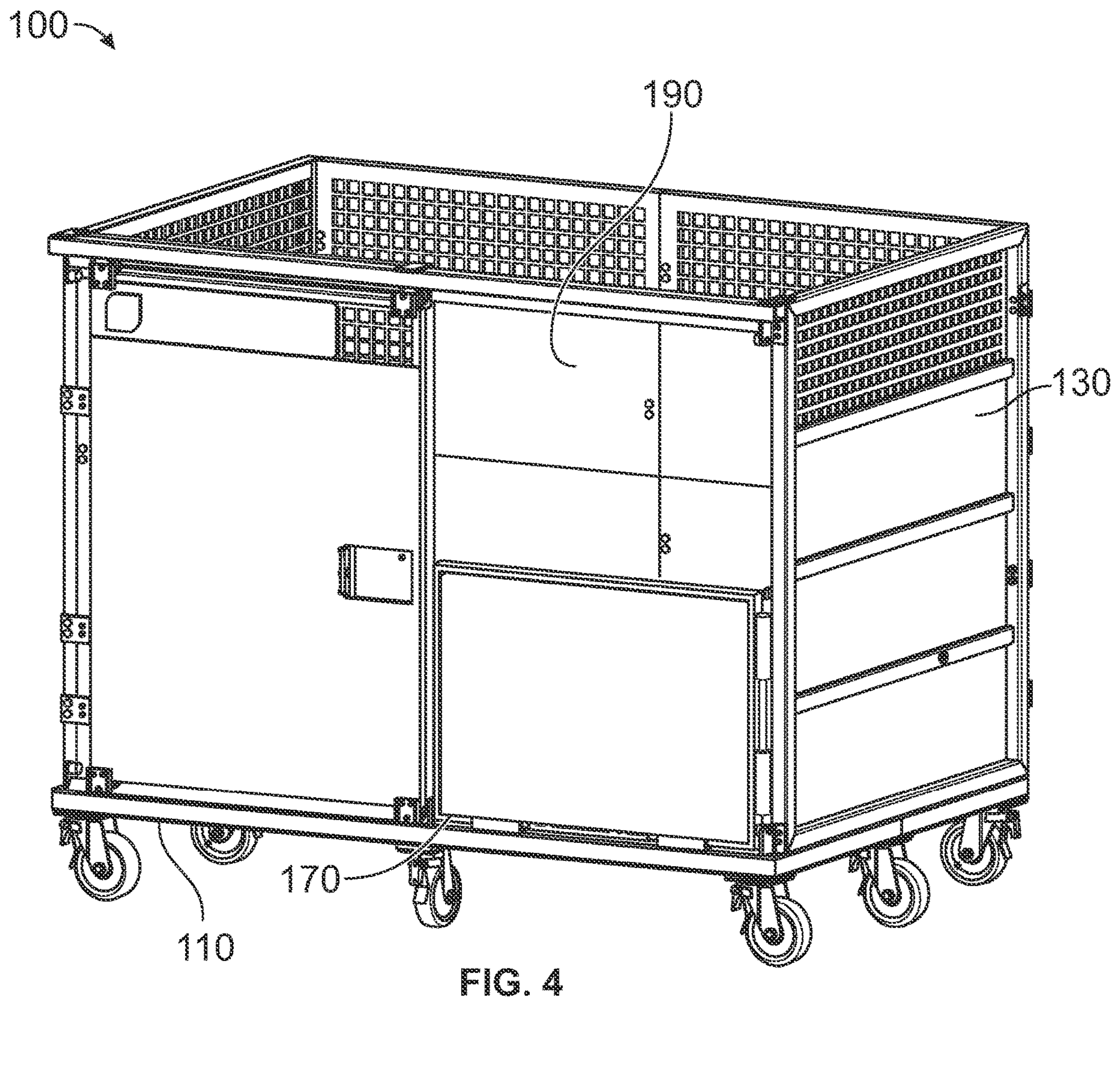
FIG. 4 is a perspective view of an alternative implementation of the waste container with the second door coupled to the floor of the waste container and a side wall of the waste container, according to aspects of the present disclosure.

FIG. 4 shows an implementation of the waste container 100 where the second door 170 is releasably coupled to both the floor and to the second side wall 130. If it is desired to use the second door 170 as a ramp, the second door 170 can be released from the side wall 130 so that the second door 170 is movably coupled to only the floor. The second door 170 can then rotate downward to the open position shown in FIG. 3B so as to form a ramp leading into the waste container. If it is not desired to use the second door 170 as a ramp, the second door 170 and/or if it is desired to have the second door 170 rotate outward, the second door 170 can be released from the floor so that the second door 170 is movably coupled to only the second side wall 130. The second door 170 can then rotate outward to the open position shown in FIG. 2B.

In any of the implementations of FIGS. 1-4, the waste container 100 can include one or more locking mechanisms that are configured to lock the first door 160 in the closed position, lock the first door 160 in the open position, lock the second door 170 in the closed position, lock the second door 170 in the open position (the open position of FIG. 2B and/or the open position of FIG. 3B), or any combination thereof. There may be separate locking mechanisms for each locking function, or there may be at least one locking mechanism that performs multiple locking functions (e.g., a single locking mechanism could be used to locking the first door 160 in the open position and to lock the second door 170 in the closed position).

Figure 5A:
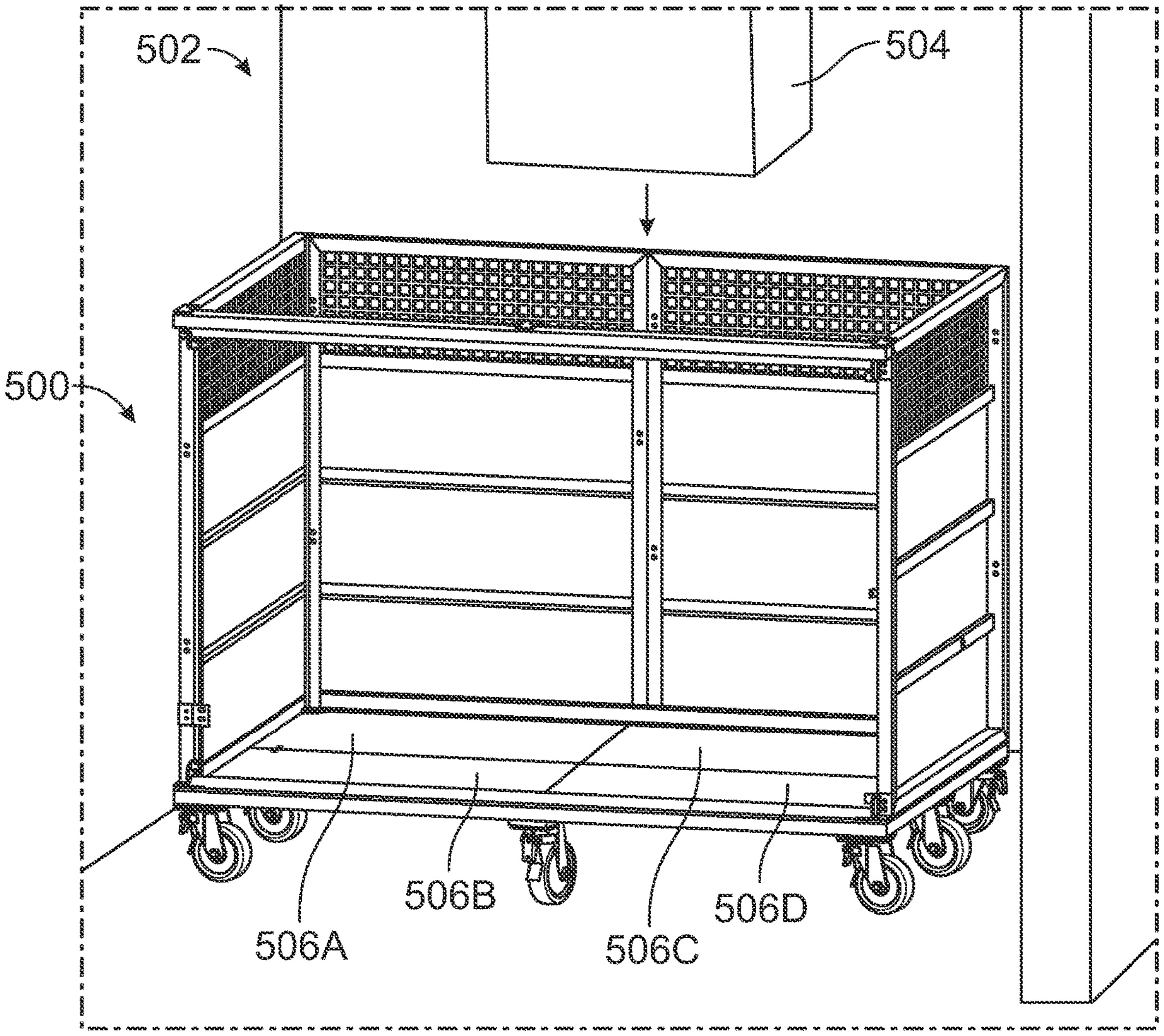
FIG. 5A is a perspective view of a first example of the waste container of FIGS. 1-4 in a trash collection room, according to aspects of the present disclosure.
Figure 5B:
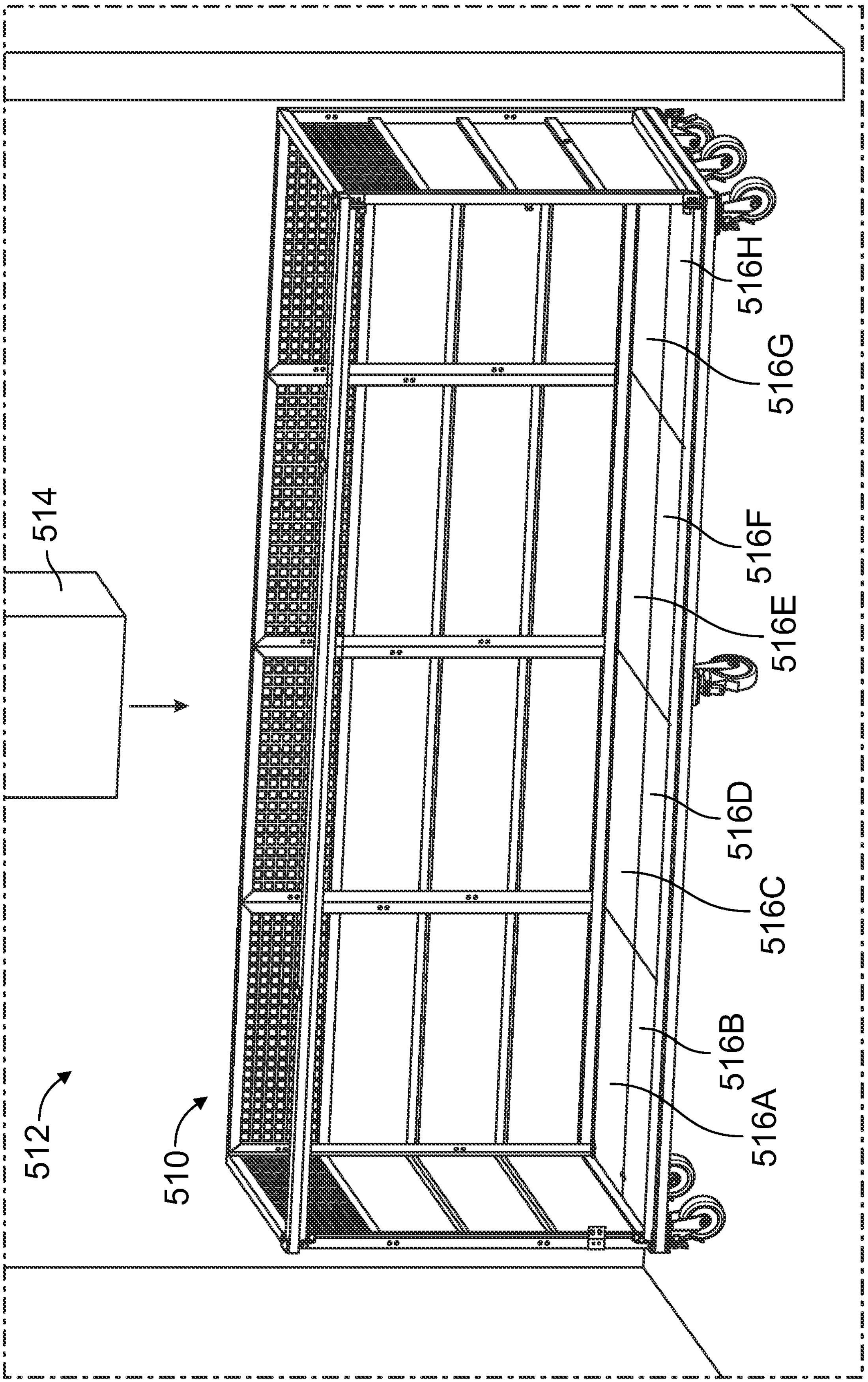
FIG. 5B is a perspective view of a second example of the waste container of FIGS. 1-4 in a larger trash collection room than FIG. 5A, according to aspects of the present disclosure.

FIGS. 5A and 5B illustrate the modularity of the waste container described herein. FIG. 5A shows a waste container 500 that is located within a trash collection room 502, underneath a trash chute 504. The waste container 500 can be any of the waste containers shown in FIGS. 1-4. As shown, the waste container 500 is sized to occupy the full width of the trash collection room 502. The floor of the waste container 500 is formed from four individual floor units 506A, 506B, 506C, and 506D that are arranged in a square shape. These floor units 506A, 506B, 506C, and 506D result in the waste container 500 occupying the fully width of the trash collection room 502.

FIG. 5B shows a waste container 510 that is located within a trash collection room 512 underneath a trash chute 514. The trash collection room 512 is wider than trash collection room 502, and the size of the waste container 510 has been increased in order to still occupy the full width of the trash collection room 512. As shown, the floor of the waste container 510 is formed from eight individual floor units 516A, 516B, 516C, 516D, 516E, 516F, 516G, and 516H that are arranged in a rectangular shape in order to occupy the full width of the trash collection room 512. However, even though the waste container 510 is larger than the waste container 500, both waste containers can still have an identical design except for their floors, including the side walls, the front and back walls, and the first and second doors.

Alternative Implementations

Alternative Implementation 1. A waste container configured to receive waste material, the waste container comprising: a floor; a first side wall coupled to the floor; a second side wall coupled to the floor and spaced apart from the first side wall; a back wall coupled to the floor and extending between a back edge of the first side wall and a back edge of the second side wall; a front wall coupled to the floor and extending from a front edge of the first side wall toward the second side wall such that a gap is defined between the front wall and the second side wall; a first door movably coupled to the front wall and movable between an open position and a closed position, the first door in the closed position extending between the front wall and a front edge of the second side wall such that all of the gap is blocked by the first door; and a second door movably coupled to the floor, the second side wall, or both, the second door being movable between an open position and a closed position, the second door in the closed position extending between the front wall and the front edge of the second side wall such that only a portion of the gap is blocked by the second door.

Alternative Implementation 2. The waste container of Alternative Implementation 1, wherein the second door is movably coupled to only the second side wall.

Alternative Implementation 3. The waste container of Alternative Implementation 2, wherein the second side wall pivots between the open position and the closed position about a generally vertical axis that is coplanar with the first side wall, the second side wall, the back wall, the front wall, and the first door.

Alternative Implementation 4. The waste container of Alternative Implementation 3, wherein the generally vertical axis is normal to the floor.

Alternative Implementation 5. The waste container of Alternative Implementation 1, wherein the second door is movably coupled to only the floor.

Alternative Implementation 6. The waste container of Alternative Implementation 5, wherein the second side wall pivots between the open position and the closed position about a generally horizontal axis that is coplanar with the floor.

Alternative Implementation 7. The waste container of Alternative Implementation 6, wherein the generally horizontal axis is normal to the first side wall, the second side wall, the back wall, the front wall, and the first door.

Alternative Implementation 8. The waste container of any one of Alternative Implementations 5 to 7, wherein when the second door is in the open position, the second door forms a ramp leading into an interior space defined by the floor, the first side wall, the second side wall, the back wall, and the front wall.

Alternative Implementation 9. The waste container of Alternative Implementation 1, wherein the second door is releasably coupled to both the floor and the second side wall, the second door being configured to pivot about a generally vertical axis between the open position and the closed position when coupled to only the second side wall, and configured to pivot about a generally horizontal axis between the open position and the closed position when coupled to only the floor.

Alternative Implementation 10. The waste container of any one of Alternative Implementations 1 to 9, wherein when the second door is in the closed position, the portion of the gap that is blocked by the second door is between about 33% and about 66%.

Alternative Implementation 11. The waste container of Alternative Implementation 10, wherein when the second door is in the closed position, the portion of the gap that is blocked by the second door is about 50%.

Alternative Implementation 12. The waste container of any one of Alternative Implementations 1 to 11, wherein the first door has a first height relative to the floor, and wherein when the second door is in the closed position, the second door has a second height relative to the floor that is between about 33% and about 66% of the first height.

Alternative Implementation 13. The waste container of Alternative Implementation 12, wherein the second height is about 50% of the first height.

Alternative Implementation 14. The waste container of any one of Alternative Implementations 1 to 13, wherein the floor is mounted on a plurality of wheels.

Alternative Implementation 15. The waste container of any one of Alternative Implementations 1 to 14, wherein the floor includes a drain pan and a grate disposed on top of the drain pan, such that liquid waste in the waste container is able to pass through the grate and collect in the drain pan.

Alternative Implementation 16. The waste container of any one of Alternative Implementations 1 to 14, wherein the floor is formed from a plurality of floor units that are each configured to be coupled to at least one other floor unit of the plurality of floor units, such that a size of the floor is adjustable.

Alternative Implementation 17. The waste container of Alternative Implementation 16, wherein each of the plurality of floor units is formed from a drain pan and a grate disposed on top of the drain pan, such that liquid waste in the waste container is able to pass through the grate of each of the plurality of floor units and collect in the drain pan of each of the plurality of floor units.

Alternative Implementation 18. The waste container of Alternative Implementation 16 or Alternative Implementation 17, wherein at least two of the plurality of floor units are mounted on at least one wheel.

Alternative Implementation 19. The waste container of any one of Alternative Implementations 16 to 18, wherein the floor has a generally planar cross-section extending along a first dimension and a second dimension, and wherein the plurality of floor units includes an equal number of floor units extending along the first dimension and the second dimension such that the floor has a square cross-section.

Alternative Implementation 20. The waste container of any one of Alternative Implementations 16 to 18, wherein the floor has a generally planar cross-section extending along a first dimension and a second dimension, and wherein the plurality of floor units includes a first number of floor units extending along the first dimension and a second number of floor units extending along the second dimension, the first number being different than the second number such that the floor has a rectangular cross-section.

These embodiments and obvious variations thereof is contemplated as falling within the spirit and scope of the claimed invention, which is set forth in the following claims. Moreover, the present concepts expressly include any and all combinations and subcombinations of the preceding elements and aspects.

We claim:

1. A waste container configured to receive waste material, the waste container comprising:

a floor;

a first side wall coupled to the floor;

a second side wall coupled to the floor and spaced apart from the first side wall;

a back wall coupled to the floor and extending between a back edge of the first side wall and a back edge of the second side wall;

a front wall coupled to the floor and extending from a front edge of the first side wall toward the second side wall such that a gap is defined between the front wall and the second side wall;

a first door movably coupled to the front wall and movable between an open position and a closed position, the first door in the closed position extending between the front wall and a front edge of the second side wall such that all of the gap is blocked by the first door; and a second door releasably coupled to both the floor and the second side wall, the second door being movable between a second-door open position and a second-door closed position, the second door in the second-door closed position extending between the front wall and the front edge of the second side wall such that only a portion of the gap is blocked by the second door, wherein the second door is configured to pivot about a generally vertical axis between the second-door open position and the second-door closed position when coupled to only the second side wall, and configured to pivot about a generally horizontal axis between the second-door open position and the second-door closed position when coupled to only the floor.

2. The waste container of claim 1, wherein the generally vertical axis is normal to the floor.

3. The waste container of claim 1, wherein when the second door is in the second-door open position, the second door forms a ramp leading into an interior space defined by the floor, the first side wall, the second side wall, the back wall, and the front wall.

4. The waste container of claim 1, wherein when the second door is in the second-door closed position, the portion of the gap that is blocked by the second door is between about 33% and about 66%.

5. The waste container of claim 1, wherein the first door has a first height relative to the floor, and wherein when the second door is in the second-door closed position, the second door has a second height relative to the floor that is between about 33% and about 66% of the first height.

6. The waste container of claim 1, wherein the floor is mounted on a plurality of wheels.

7. The waste container of claim 1, wherein the floor includes a drain pan and a grate disposed on top of the drain pan, such that liquid waste in the waste container is able to pass through the grate and collect in the drain pan.

8. The waste container of claim 1, wherein the floor is formed from a plurality of floor units that are each configured to be coupled to at least one other floor unit of the plurality of floor units, such that a size of the floor is adjustable.

9. The waste container of claim 8, wherein each of the plurality of floor units is formed from a drain pan and a grate disposed on top of the drain pan, such that liquid waste in the waste container is able to pass through the grate of each of the plurality of floor units and collect in the drain pan of each of the plurality of floor units.

10. The waste container of claim 8, wherein at least two of the plurality of floor units are mounted on at least one wheel.

11. The waste container of claim 8, wherein the floor has a generally planar cross-section extending along a first dimension and a second dimension, and wherein the plurality of floor units includes an equal number of floor units extending along the first dimension and the second dimension such that the floor has a square cross-section.

12. The waste container of claim 8, wherein the floor has a generally planar cross-section extending along a first dimension and a second dimension, and wherein the plurality of floor units includes a first number of floor units extending along the first dimension and a second number of floor units extending along the second dimension, the first number being different than the second number such that the floor has a rectangular cross-section.

13. The waste container of claim 1, wherein when the first door is in the open position, the first door is aligned with the first side wall, and when the first door is in the closed position, the first door is aligned with the second door.

14. The waste container of claim 1, wherein the first door is slidably mounted on at least a bottom rail that is positioned adjacent to the floor, and wherein the when the second door is in the closed position, the second door blocks at least a portion of the bottom rail from an interior of the waste container.

15. The waste container of claim 1, wherein when the second door is in the closed position, the second door is generally coplanar with the front wall.

* * * * *